United States Patent [19]

Sullins

[11] Patent Number: 4,799,987

[45] Date of Patent: Jan. 24, 1989

[54] PIPE TURNING APPARATUS

[75] Inventor: Harry P. Sullins, Blytehwood, S.C.

[73] Assignee: Richland Industries, Columbia, S.C.

[21] Appl. No.: 37,266

[22] Filed: Apr. 10, 1987

[51] Int. Cl.$^4$ .............................................. B65H 81/06
[52] U.S. Cl. .................................... 156/425; 156/446; 242/7.21; 279/74
[58] Field of Search ............... 156/446, 425, 428, 429, 156/195, 187–188, 189, 173, 175, 443, 184, 190–192; 242/7.19, 7.21–7.23, 68.4; 279/74

[56] References Cited

U.S. PATENT DOCUMENTS

| | | |
|---|---|---|
| 850,124 | 4/1907 | Badgley . |
| 1,329,815 | 2/1920 | Thordarson . |
| 1,435,091 | 11/1922 | Stevens ............................ 242/7.23 |
| 1,506,891 | 9/1924 | Duncan ............................ 242/68 X |
| 1,876,760 | 9/1932 | Rosener . |
| 1,996,491 | 4/1935 | Schedavek et al. .................. 156/425 |
| 2,269,405 | 1/1942 | Boucher . |
| 2,360,109 | 10/1944 | Converse . |
| 3,292,939 | 12/1966 | Lorenz ............................ 279/74 X |
| 3,974,009 | 8/1976 | Butzou ............................ 156/173 X |
| 3,979,246 | 9/1976 | Ikeda et al. . |
| 4,089,727 | 5/1978 | McLain ........................... 156/173 X |
| 4,093,193 | 6/1978 | Cassidy et al. . |
| 4,527,749 | 7/1985 | Matthews et al. ............. 242/7.21 X |
| 4,569,710 | 2/1986 | Lambot et al. . |

Primary Examiner—David Simmons
Attorney, Agent, or Firm—Pollock, Vande Sande & Priddy

[57] ABSTRACT

A pipe turning apparatus for rotatably mounting and turning a pipe and having a threaded chuck member for rotatably engaging one end of the pipe and a chuck fitting for slidably engaging the other end of the pipe. The threaded chuck member reciprocates and is rotatable by a drive mechanism in opposite directions so as to engage and disengage threads on the one pipe end. The chuck fitting slidably receives the other pipe end which may carry thereon a second coupling which remains threaded on the pipe. The chuck fitting may include resilient fingers surrounded by an adjustable collar so as to vary the force for gripping the other pipe end and for quick insertion and removal of the other pipe end from the fitting. The drive mechanism may be activated by the motor of a conventional hand drill. Turning apparatus may include attachments for wrapping the pipe with a web or coating the pipe with a chemical coating composition.

20 Claims, 4 Drawing Sheets

FIG 2

PIPE TURNING APPARATUS

FIELD OF THE INVENTION

This invention relates a device for turning a pipe to wrap it with a web of flexible material or to coat it with a coating composition, such as a refractory coating for extending its useful life as a lance for injecting a refining gas beneath the surface of a bath of molten ferrous or non-ferrous metal.

BACKGROUND OF THE INVENTION

In a blast furnace, smelting furnace, reclaiming furnace, or similar facility for melting and refining metal ores, or scrap metals, a lance is utilized to inject a refining gas beneath the surface of a bath of the molten metal composition while it is held in a refractory vat or similar container. The refining gas bubbles up through the molten mass and aids in the removal of impurities from the molten metal composition. Lances made of metal pipe alone are consumed rapidly within the vat and need to be replaced on a frequent basis. To reduce the rate of lance consumption, the bare metal pipe may be wrapped with a web impregnated by a liquid refractory coating composition, which may reduce substantially the rate of consumption of the metal pipe.

DISCLOSURE OF THE INVENTION

The pipe turning apparatus of the present invention is an improvement over the device for coating a pipe with a refractory coating as described in Ser. No. 913,582 filed Sept. 30, 1986, which was a continuation of Ser. No. 386,638 filed June 9, 1982. The entire contents of these two applications are incorporated herein by reference. The improved device of the invention can be used to substantially increase the speed at which a bare pipe segment may be coated by spirally wrapping the pipe with a web of absorbent material impregnated with a liquid refractory coating composition. It is therefore an object of the present invention to provide an improved apparatus for turning a pipe so that it may be spirally wrapped with a web of jute burlap impregnated with a liquid refractory coating composition made by mixing water with a dry refractory mortar mix.

A further objection of the invention is to provide a pipe turning apparatus for rapidly wrapping a web around a bare pipe segment and facilitating rapid insertion of the bare pipe and rapid removal of the wrapped pipe relative to the apparatus.

Another object of the invention is to provide a pipe turning device with means for engaging threads on one end of a pipe segment and means for engaging a pipe coupling on the opposite end of the pipe segment so that the pipe segment may be mounted and turned in and removed from the turning device with the pipe coupling carried thereon.

A further object of the invention is to provide an improved machine for making a refractory coated lance having a coupling on one end of each lance for securing a new lance to a partially consumed lance in order to inject a refining gas through the new lance and the partially consumed lance into a desired volume beneath the surface of a molten metal bath.

A still further object of the invention is to provide a pipe or tube turning device which may be powered by a conventional motorized hand tool, such as conventional electric drill.

Another object of the invention is to provide means for securing an elongated hollow cylinder, such as a pipe or tube, in an apparatus for turning the cylinder so that its outer surface may be wrapped with a flexible web and/or coated with a liquid coating composition, such as a liquid refractory mortar mix.

Still another object of the invention is to provide a device for turning a metal or non-metal tube or pipe so that its outer surface may be spirally wound with a water absorbent, non-refractory web impregnated with a liquid refractory coating composition to thereby provide a composite lance comprising a tubular base coated with a refractory material.

A further object of the invention is to turn a tubular base member in spaced relation to a tension bar immersed in a liquid refractory composition so as to wrap the tubular base member with a porous flexible web which has been impregnated with the liquid refractory composition and tensioned by passing the web around the tension bar before winding the impregnated and tensioned web onto the tubular base member.

Another object of the invention is to provide a pipe turning device which is axially adjustable so as to receive and turn pipe segments of different lengths.

A further object of the invention is to provide a method and apparatus for surrounding a tubular base member with a coating comprising a non-refractory web embedded within a refractory mortar composition to enable the composite tubular structure to be bent into curved shapes and to be inserted into molten metal baths without fracture or separation of the refractory coating from the tubular base member. These and other objects and features of the invention will be apparent from the following description and appended claims.

The above objects are achieved by a device for turning a metal pipe or other tubular member so that a web may be spirally wrapped around and supported on this tubular core. The device includes a web dispensing means, a pipe mounting means positioned in spaced relation to the web dispensing means, a drive means, and optionally, a trough means positioned between the web dispensing means and the pipe mounting means for impregnating the web with a liquid coating composition. The pipe mounting means is operative to rigidly secure the pipe in a fixed position for rotation about its longitudinal axis. The drive means is connected to the mounting means and is operative to rotate the mounting means and the pipe mounted therein. The web dispensing means is operative to dispense the web after it has been secured to the rotatably mounted pipe and when the drive means turns the pipe to wind the web thereon.

The term "pipe" is used in this specification to mean an elongated tubular member on which a web may be wound, and therefore is used in a generic sense to designate all such elongated tubular members, including pipes, tubes, hollow cylinders, and the like. When used in a composite lance, the pipe provides a base member or core for supporting a web wrapping either alone or embedded in a chemical coating composition surrounding the outer surface of the pipe over a majority of its length.

The pipe mounting means, the pipe drive means, the web dispensing means, and the trough means, when optionally provided, are preferably mounted on the same frame. When a trough means is provided for impregnating the web with a coating composition, the pipe mounting means is preferably positioned over a container portion of the trough means and the web dispensing means is preferably positioned on an open front side of the trough container adjacent to and below either a low front panel or a sloped bottom panel of the trough container.

The pipe mounting means comprises two opposing chuck means each adjacent to a corresponding end of the trough container. Both chuck means are rotatably mounted such that both chuck means with a pipe mounted therebetween are turned by the drive means of the pipe turning device. One chuck means is directly attached to the drive means so as to drive the mounted pipe and includes a pipe engaging means for rotatably engaging a driven end of the pipe mounted between the two opposing chuck means. The other chuck means is driven by the mounted pipe and includes a fitting for slidably receiving the end of the pipe opposite to its driven end. This opposite end preferably has a smooth (unthreaded) outer surface, and more preferably carries a coupling with a smooth outer surface. The fitting preferably includes a plurality of resilient fingers for firmly gripping a smooth pipe end or coupling slidably received therebetween.

Both the driving chuck means and the driven chuck means are carried on corresponding shafts, each of which is mounted in a corresponding bearing means for rotation in response to the drive means. While the driven chuck means is restrained against axial movement by its bearing means, the bearing means of the driving chuck means is mounted to provide axial reciprocal movement of the driving chuck means and its corresponding shaft in the direction of the longitudinal axis of a pipe mounted in the pipe mounting means. Alternately, such reciprocal movement of the driving chuck means may be provided by allowing relative axial movement between its shaft and bearing means.

The drive means comprises a motor, preferably actuated by electrical power, and means for connecting a drive shaft of this motor to the rotatably mounted shaft of the driving chuck means. The motor may be that of a hand drill, in which case the connecting means preferably comprises the drill chuck and a pin held in the drill chuck and secured to the end of the shaft of the pipe driving chuck means opposite to the driving chuck means itself.

The pipe core or base of a wrapped pipe or a coated lance made according to the present invention comprises a standard metal pipe. Although a wide variety of metal pipes may be used, the preferred metal pipe is made of relatively inexpensive carbon steel, such as A-120 carbon steel. While the size of the pipe also may vary over a wide range, the preferred pipe size for metal refining lances has a nominal diameter of about 1 inch. The thickness of the pipe also may vary over a wide range, the diameter and wall thickness of the pipe combining to define the weight of the pipe per unit length. In selecting a pipe wall thickness, the cost of the pipe must be balanced against the effect of increased thickness on its useful life, pipes of greater wall thickness tending to last somewhat longer in use but also costing more. Thus, while either heavier or lighter pipe may be used, ASTM Schedule 40 pipe is preferred as being the best balance between the cost of the material and the useful life of the product. For ease of winding and for use as a lance in metal refining, each pipe segment is preferably about 10½ feet long.

The web wound onto a pipe segment using the apparatus and method of the present invention may be of woven or non-woven material made from synthetic fibers, such as fiberglass, rayon, nylon or the like, or from natural fibers, such as cotton, wool, jute or the like. Where the pipe is about 10½ feet long, the wrapped length thereof is preferably about 10 feet 2 inches, leaving about 2 inches at either end for connection to adjoining pipe segments, about 1.25 inches of each end preferably being threaded for a coupling. Where pipe couplings are used to secure one threaded segment of wrapped pipe to the next, the couplings are preferably standard merchants couplings. One of these couplings is preferably placed on the pipe segment before it is inserted in the turning apparatus and this coupling remains on the final product when it is removed from the turning apparatus.

The web wound on each pipe segment preferably is about 6 inches wide and preferably is wound so that each winding overlaps the next by about 5 to about 5.25 inches, thereby leaving about ¾ to 1 inch of the previous winding uncovered. This gives a total of about 6 to about 8 spiral wraps per 6 inches of pipe length such that after the initial 5 to 5¼ inches of wrapped pipe, there are a total of 6 to 8 plies of the web layered one on top of the other. This requires about 17 yards of web material for each pipe segment of 10½ feet where the web is made of a woven jute burlap. 6 to 8 plies of burlap web increases the outside diameter of a 1 inch nominal diameter schedule 40 pipe from about 1.25 inches to about 2.25 inches.

When a trough means is used as part of the turning apparatus in order to impregnate the web with a liquid coating composition, the coating composition is placed within the trough container and the web is moved through the trough container prior to being placed around the pipe. Tension bar means is preferably secured within the trough container above the base thereof and below the normal level of the coating composition. The web is pulled around the tension bar means in order to tension the web and to move the web material through the coating composition before it is wound onto the pipe. Liquid dispensing means is located outside of the trough container and is operative to feed the coating composition to the trough container.

Cutting means is provided to cut the web dispensed from the web dispensing means when the web has been completely placed around the pipe in the desired number of windings per unit length.

The method for placing the web around a pipe comprises mounting a segment of the pipe for rotation in spaced relation to the web dispensing means, securing the free end of the web from the web dispensing means to the pipe, and turning the pipe. When the pipe is turned, the web material is pulled from the web dispensing means and wrapped around the pipe. The free end of the web is preferably secured under the first one or two windings of the web in order to lock the beginning portion of the web securely onto the pipe. The web wrapped around the pipe optionally may be impregnated with a liquid coating composition, such as the liquid refractory mortar mix described below. Although a dry web may first be wound around the pipe and the resulting windings then impregnated with the liquid coating composition, it is preferred to first impregnate the web and then wind the impregnated web around the pipe.

When the web is to be impregnated, the coating composition is placed in a trough means located between the web dispensing means and the pipe mounting means and the web material is pulled through the coating composition as the pipe is turned. This pipe coating method may further comprise causing the web to move around a bar means adjacent to the lowest point within the trough container in order to pull the web material beneath the surface of the coating composition and force the composition in the web material, which preferably is porous and water absorbent, as the pipe is turned. The method further comprises moving the web dispensing means along the length of the trough container, either manually or mechanically, thereby enabling the web to be wound spirally around the length of the pipe segment. The tail end of the web material for each pipe segment is cut from the continuous supply of web material provided by the web dispensing means after the desired length of web has been wound around the desired length of the pipe segment. The method further comprises removing excess coating composition from the web material after the web has been placed around the pipe. The coated pipe is then removed from above the trough container and placed into preferably a vertical position to dry.

If the web is to be impregnated with a liquid refractory coating composition of the type described below, it is preferably made of a water absorbent, porous material such as woven or non-woven jute burlap. One or more plies of the impregnated web are applied to a tubular substrate by the turning apparatus of the invention while the coating composition is still liquid (wet) and before it sets. The composite tubular structure is then removed from the turning apparatus and air dried, either at ambient temperature or with heating, to form a dry chemical coating firmly adhered to the substrate. An impregnated web may be used to provide a dry chemical coating on a wide variety of tubular substrates, such as metal, ceramic or plastic pipes.

A preferred application of the invention is the provision of a dry refractory coating on carbon steel pipes which are used as lances for injecting reducing gases and other refining agents beneath the surface of a molten mass comprising a metal being refined or otherwise treated to produce substantially pure metal from a metal ore or from scrap metal. Such refractory coatings extend by a substantial amount the usable life of the metal substrate when it is in contact with a molten metal bath at high temperatures.

When the wrapped pipe is to be used as a metal refining lance, the web is impregnated with a liquid refractory mixture, preferably a refractory mortar mixed with water. As used in this specification, a "refractory mortar" comprises a finely ground dry refractory material which becomes plastic when mixed with water, is air or heat settable, and is suitable for use in thin layers (1/16 inch or less, preferably 1/32 inch or less) for binding together refractory brick of the type used in making the lining of furnaces such as those for refining metals. Refractory mortars of the type employed with the invention are commercially available and may be obtained either wet (premixed with water) or dry. Refractory mortar compositions of this type are described more specifically in copending patent application Ser. No. 903,974 filed Sept. 4, 1986, the entire contents of this application being incorporated herein by reference. A web impregnated with the web refractory mortar composition, upon drying at room temperature, forms a chemically-bonded dry refractory coating in which the web material is permanently embedded. This dry refractory composition, at temperatures sufficiently high to fuse glass and the like, forms a ceramically-bonded refractory coating from which the organic web material will be substantially removed by combustion.

Using the turning apparatus and method of the invention, the wrapping of each 10.5 foot pipe segment with a refractory coating requires only about 10 to 15 seconds. This method and apparatus also provides sufficiently tight windings that the coating composition is caused to flow or "weep" through the successive layers of porous burlap so that any excess coating material will flow to the exterior surface of the last wrap of burlap, from which it may be removed or "skimmed" by hand or mechanical means. After the excess liquid composition is removed, the coated pipe is removed from the apparatus and put aside to air dry.

Pipe segments wrapped according to the present invention with an impregnated web may be used as lances for injecting a reducing gas or other refining agent into a molten metal bath for purifying the metal, which may be a non-ferrous metal like copper or aluminum. The process for treating a molten metal composition with the coated pipe comprises providing a supply of a refining or other treating agent, and utilizing the coated pipe as a lance to convey the treating agent from its source to the desired treatment area within a melting vat containing the molten metal composition. The refractory coated metal pipe segments are preferably threaded so that they may be connected together in a string to provide an elongated tubular structure with a continuous opening from the first end of the string to the second end of the string through which the treating agent may travel. The treating agent may be a gas or a pneumatically conveyed solid. Where the furnace surrounding the vat has a top entrance, a string of two or more lances may be fed through this top entrance and the lower end of the string submerged in the molten metal bath. The upper end of the string projects out of the furnace and may be hand held or suspended from a chain hoist or the like. About 3 to 8 feet, preferably about 5 feet, of the lance is immersed below the surface of the molten metal bath to inject the refining agent, preferably an oxygen containing gas such as air, well below the surface of the molten metal bath.

The refractory material secured to and surrounding the metal pipe core of a metal refining lance is operative to insulate the metal core from the molten metal in the melting vat and other heated surrounding structure in the refining furnace when the lance is placed in the melting vat. A first connecting area on one end of the metal core extends outward beyond the refractory coating. A second connecting area on the other end of the metal core also extends outward beyond the refractory coating. The first connecting area has a first threaded portion and the second connecting area has a second threaded portion. The second threaded portion of each lance preferably carries a threaded coupling so that the first threaded portion of another lance may be threaded into the coupling of any one lance to thereby provide a string of successive lances connected one to another.

A metal pipe coated according to the present invention has many advantages over the use of a bare (uncoated) metal pipe when used as a lance for introducing refining agents below the surface of a molten mass of copper, which is maintained at a temperature of about 2700° to about 2800° F. in a refining or reclaiming furnace. While a 10½ foot segment of bare schedule 40 pipe is consumed in about 3 minutes, the coated schedule 40 pipe lasts about 45 to 60 minutes. The life of the pipe serving as the core of a composite lance is thus extended by a multiple of at least about 10 times, and as much as about 15 to 16 times, by wrapping this core with a web impregnated by a liquid refractory coating composition of the type described above.

BRIEF DESCRIPTION OF THE DRAWINGS

The invention may be understood more fully from the following description and appended claims when taken with the accompanying drawings in which:

DESCRIPTION OF BEST MODE AND OTHER EMBODIMENTS

Figure 1:
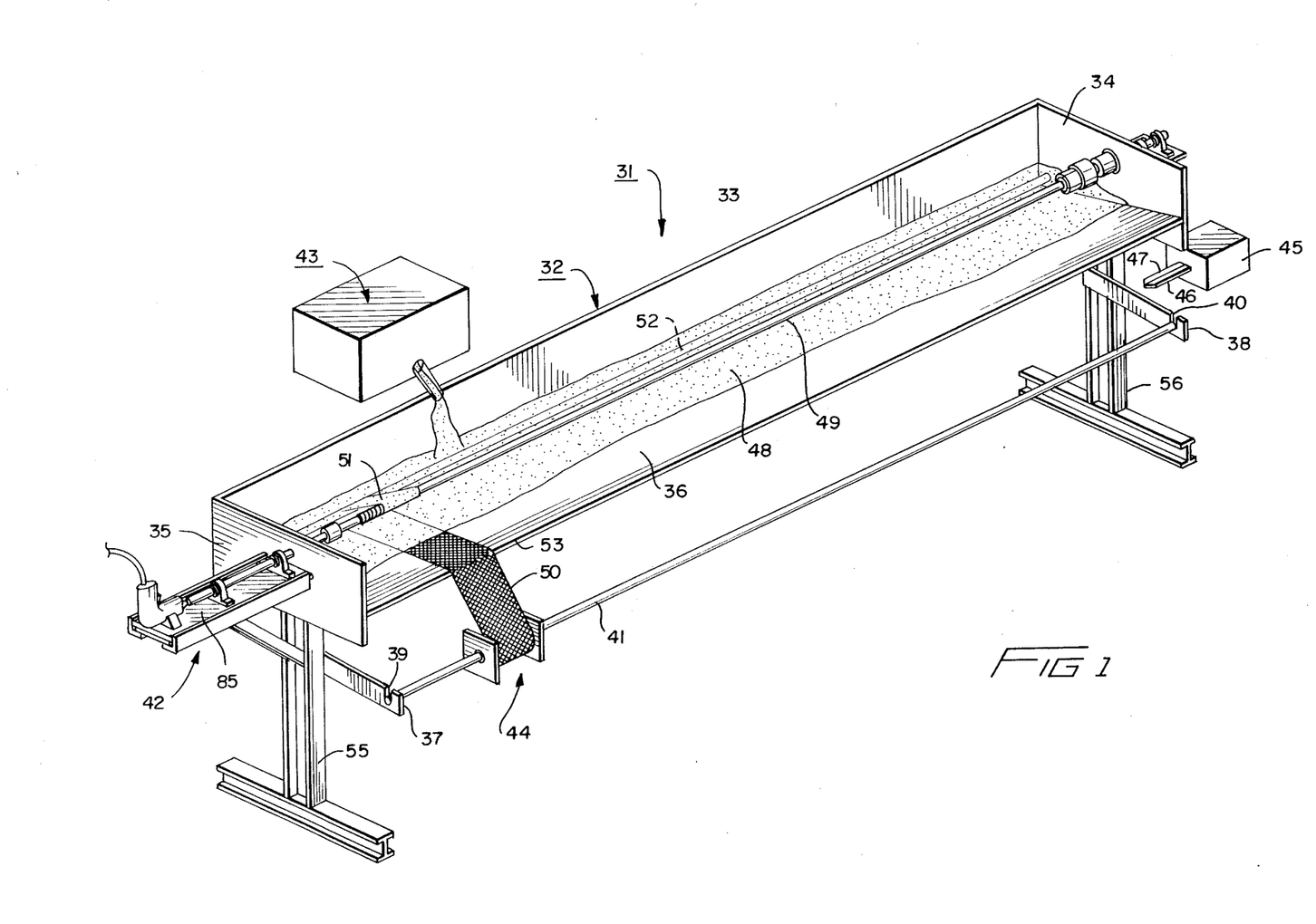
FIG. 1 is a perspective view of the pipe turning device of the invention mounted on a trough for holding a liquid pipe coating composition.
Figure 2:
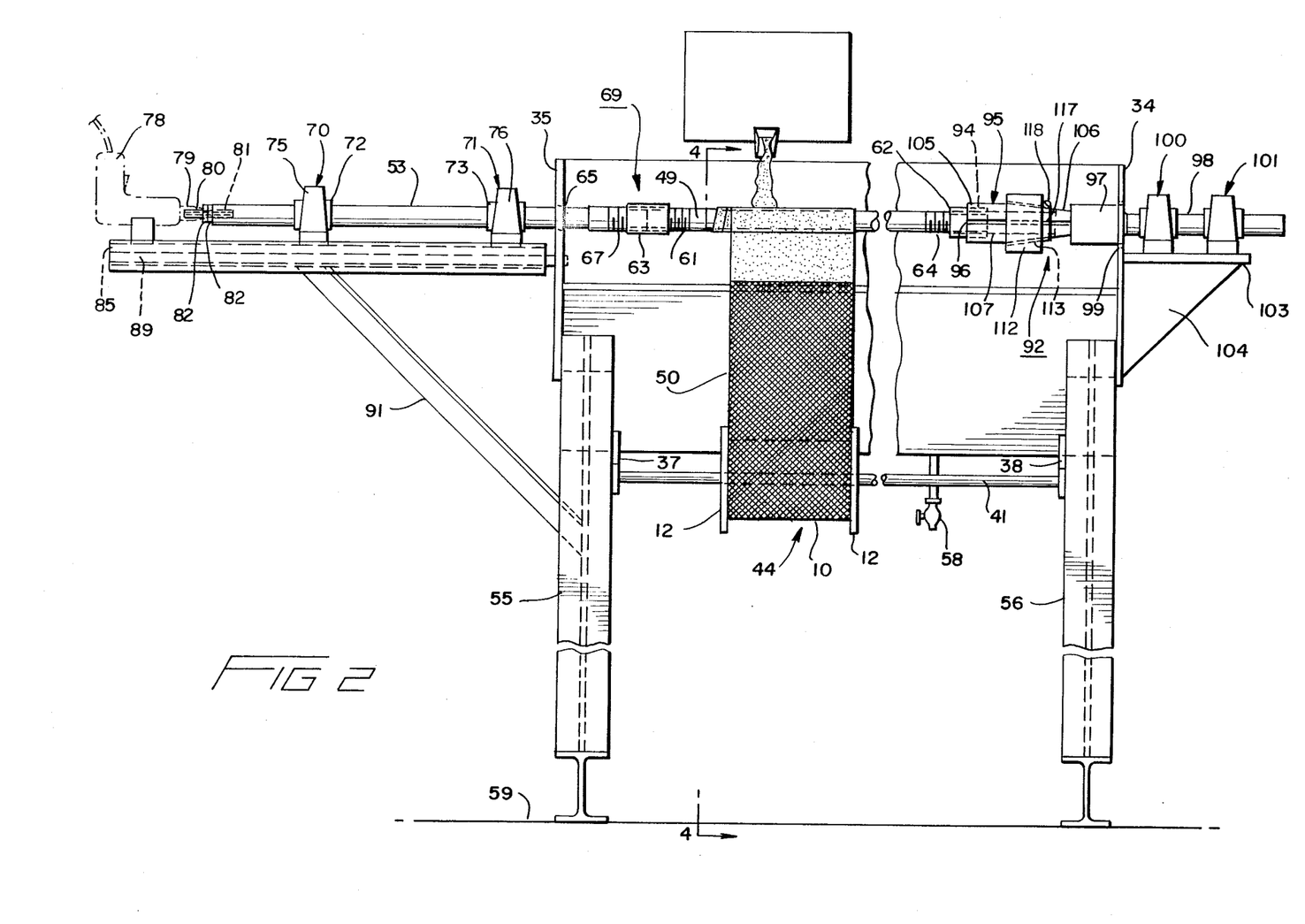
FIG. 2 is a fragmentary front elevational view of the pipe returning device and trough of FIG. 1.
Figure 3:
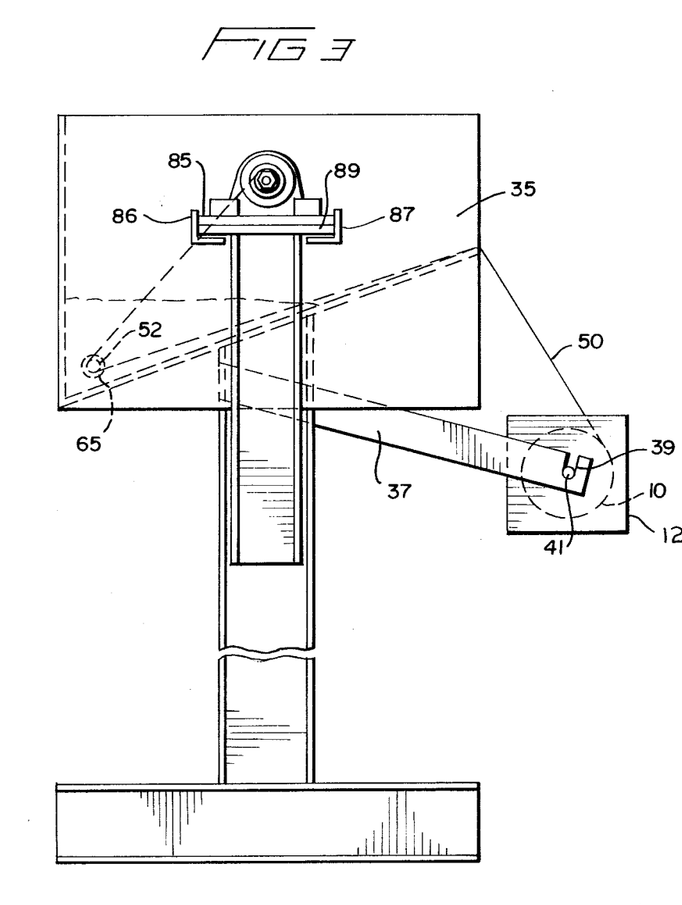
FIG. 3 is a fragmentary elevational end view of the driving end of the pipe turning device and trough of FIG. 1.
Figure 4:
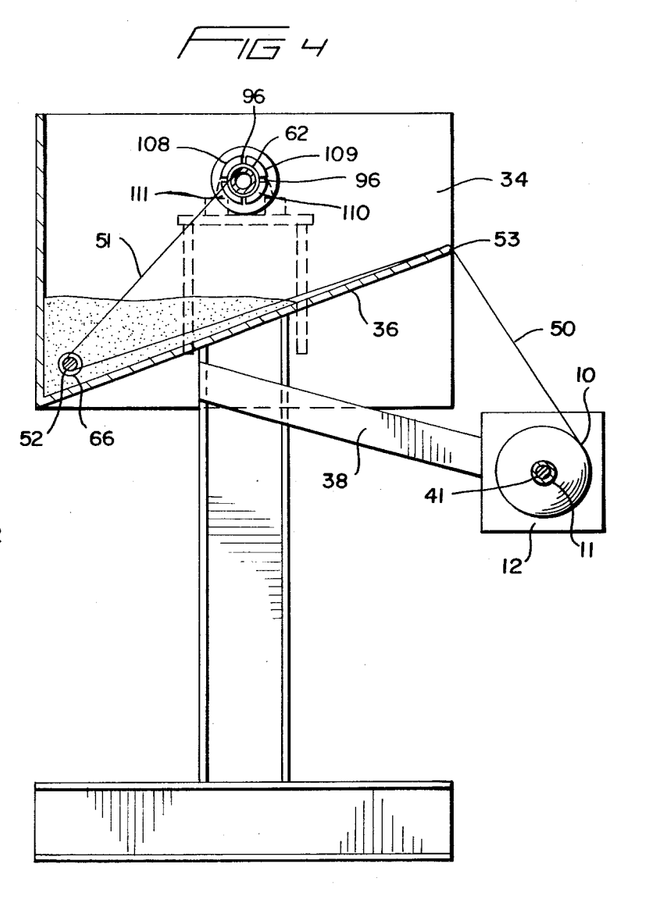
FIG. 4 is a cross-sectional elevational view of the pipe turning device and trough taken along lines 4—4 of FIG. 2.

FIG. 1 is a perspective view of a pipe turning and coating device, generally designated 31. Pipe turning and coating device 31 includes a liquid holding trough 32. As seen best in FIGS. 1–4, liquid holding trough 32 has a back panel 33, a side panel 34, an opposing side panel 35, and a bottom panel 36. Utilized with trough 32 are a pipe turning means 42, a web dispensing means 44, and a coating dispensing means 43 for keeping trough 32 filled with a liquid coating composition 48. The trough 32 is supported on a floor 59 by a pair of opposing legs 55-56, one at each end of the trough. The legs 55 and 56 are in the shape of an inverted T wherein the leg of the T comprises an I-shaped beam extending vertically from the arms of the T and secured to the bottom and side panels of the trough, as by welding.

In utilizing the pipe coating device 31, a pipe segment 49 is secured in a mounting means by threads 61 at one end and by coupling 62 threaded on threads 64 at the other end. The pipe mounting means comprises a driving chuck means 69 which includes a coupling 63 secured to the threaded end 67 of a drive shaft 53 which extends through an aperture 65 in side panel 35 of the trough and is rotatably carried in a pair of axially spaced pillar block bearings 70 and 71. Bearings 70 and 71 are preferably of the self-aligning type utilizing ball or roller bearings. The self-aligning feature is provided by the sleeves 72 and 73, respectively, which are movable relative to the respective housings 75 and 76 which provide races for the ball or roller bearings. The pipe coupling 63 has internal threads for engaging the threaded end 61 of the pipe segment 49. Coupling 63 may be welded to the end of drive shaft 53 but preferably is threaded thereon as shown in the drawings. Drive shaft 53 may be made from solid cold rolled carbon steel stock, preferably 1¼ inches in diameter with a 1¼ inches diameter end portion threaded at 67 to fixedly receive coupling 63. The remaining portion of shaft 53 is reduced to a 1 inch diameter for mounting in standard 1 inch bearings.

The end of drive shaft 53 opposite from coupling 63 is driven by a drive means, such as a hand held, reversible drill 78 having an electric motor (not shown) and a drill bit chuck 79. The drill chuck 79 is drivingly connected to drive shaft 53 by a threaded pin 80, the opposite end of which is threaded into a tapped and threaded hole 81 in the end of shaft 53 opposite to coupling 63. Pin 80 is removably locked in shaft hole 81 by means of a pair of locking nuts 82-82.

The housings 75 and 76 of bearings 70 and 71 are mounted on a sliding plate 85 such that the drive shaft 53 and the associated components previously described may be reciprocated in the axial direction of shaft 53 to allow coupling 63 to be engaged with and disengaged from the corresponding threaded end 61 of pipe 49. This axial sliding movement of drive shaft 53 also permits the mounting and turning of pipe segments of different lengths, provided that the range of differences in the pipe lengths is within the range of movement of sliding plate 85. Mounted along either side of the sliding plate 85 is a pair of angle irons 86 and 87 which slidingly engaged a fixed base plate 89 as may be seen best in FIG. 3. Base plate 89 is rigidly secured at one end, as by welding, to trough side panel 35. Base plate 89 also is supported in cantilever fashion by a slanted brace 91 which may be made from U-shaped channel stock. One end of brace 91 is secured to the underside of a mid-portion of base plate 89 and the other end of brace 91 is rigidly secured to the vertical I-beam of trough leg 55.

The pipe mounting means further comprises a driven chuck means 92 having a fitting 95. The coupling 62 carried by pipe 49 is slidingly received in a recess 94 of the fitting 95. The fitting 95 is rigidly secured to a boss 97 which in turn is rigidly secured to a driven shaft 98 rotatably carried in a pair of self-aligning pillar block bearings 100 and 101, which are preferably of the same construction as bearings 70 and 71. Boss 97 is connected to shaft 98 through an aperture 99 in trough side panel 34. Bearings 100 and 101 are secured to a mounting plate 103 supported in cantilever fashion on the outside of trough side panel 34 by a triangular brace plate 104. The drive shaft 53 is secured against axial movement relative to bearings 70 and 71 and driven shaft 98 is secured against axial movement relative to bearings 100 and 101 by fixing means, such as allen set screws (not shown).

The driven chuck means 92 has special features allowing quick insertion and removal of the pipe end carrying coupling 62. Although these components may be welded together, fitting 95, boss 97 and shaft 98 are preferably made from a single piece of solid cold rolled carbon steel stock. For example, the piece of stock may be 2 inches in diameter where the pipe to be mounted is nominal 1 inch schedule 40 pipe with a standard merchants coupling on one end. By way of further example, a piece of the stock 16 inches long may be turned on a lathe to provide a 2 inch diameter cylindrical portion 105, a tapered portion 106, a 2 inch diameter boss 97, and a 1 inch diameter shaft 98. Portion 106 is tapered axially at about 10°–15° for a length of about 3¼ inches. The fitting 95 comprises the portions 105 and 106 and this fitting is tapped through the outer end, first with a 1 inch deep, 1 9/16 inch diameter bore forming recess 94 followed by a 3½ inch deep 1 inch diameter bore forming a hollow chamber 107. Two transverse cuts 96-96 are then made 90° apart through the walls of recess 94 and chamber 107 as defined by the tapped portions to thereby provide four identical leaf spring type fingers 108, 109, 110 and 111 for resiliently gripping the coupling 62 as may be seen best in FIGS. 4 and 5. To increase the resiliency and toughness of the resulting cantilevered style fingers, the fitting is heated to a red hot temperature and then dropped in an ambient oil bath for purposes of heat treatment.

The four resilient fingers 108, 109, 110 and 111 are preferably tensioned by being forced together slightly by a collar 112 so that the diameter of recess 94 is slightly less than the outside diameter of pipe coupling 62, such that pipe coupling 62 will be firmly held in the frictional grip of the outer portions of the resilient fingers which now define the recess 94. This frictional grip fixes the position of coupling 62 with respect to fitting 95 so that these two components rotate together without significant slippage. Collar 112 has an internal aperture 113, the walls of which are sloped at an angle corresponding to the axial taper of portion 106 of fitting 95. Because of the cuts or slits 96 between the resilient fingers, the diameter of recess 94 may be varied by adjusting collar 113 axially along portion 106 of fitting 95. The axial position of collar 113 relative to fitting 95 is adjustably fixed by means of a clamping member 117 having an adjustable screw or worm element 118. Clamping member 117 may comprise a conventional hose clamp.

Web dispensing means 44 comprises a roll 10 of woven burlap fabric 50 wound on a hollow cylindrical core 11 secured between the apertures of a pair of rectangular end panels 12-12. Core 10 and end panels 12-12 are slidable and rotatable as a unit on a web dispensing bar 41. Web dispensing bar 41 is supported by bar end supports 37 and 38, support 37 having a slot 39 and support 38 having a slot 40 for receiving a groove at each end of bar 41. If this configuration is utilized, the web dispensing bar 41 may be lifted from bar supports 37 and 38 and a new roll 10 of burlap can be added to replace the prior core 11 when it is depleted of burlap, i.e., when all of the fabric or other web material has been dispensed from the prior roll. The mounted roll of web material forms part of the web dispensing means 44.

The fabric web 50 extends into the trough 32 and around a tension bar 52. Tension bar 52 can turn and is rotatably mounted at each end in annular bearing flanges 65 and 66. Bearing flange 65 is mounted on side panel 35 of trough 32 and bearing flange 66 is mounted on side panel 34 of trough 32. These bearing flanges frictionally engage the ends of bar 52 so that it will cause tension in the web. The dispensing means 43 dispenses the liquid coating composition 48 into the trough 32 so that the dry web 50 from web dispensing means 44 will pass through the liquid coating composition 48 while passing around tension bar 52. The composition 48 impregnates and adheres to the fabric or other wrapping material of dry web 50 to provide a coated web 51.

The coated web 51 is wound onto pipe 49 when the pipe turning means 42 is activated to turn the drive shaft 53, which first rotates coupling 63 relative to the threaded pipe end 61 to engage these threads with the internal coupling threads and then rotatably drives pipe 49 when the two sets of threads become fully engaged. Prior to activating turning means 42, the end coupling 62 on a bare pipe segment 49 is inserted into recess 94 of fitting 95, pipe segment 49 is then held in axial alignment with drive shaft 53, and drive shaft 53 is axially advanced to push coupling 63 against the adjacent threaded end 61 of pipe 49, which aligns the internal coupling threads with the external pipe threads 61. This pipe mounting and engagement process may be accomplished manually or by mechanical means. The process is speeded up significantly by the resiliency of the fingers defining recess 94 of fitting 95, and may be speeded up even further by activating drill 78 while shaft 53 is being axially advanced so that the meeting of the coupling with the adjacent pipe end and the engagement of the coupling threads with pipe threads 61 are one continuous operation.

The turning of pipe 49 with the free end of the web secured thereto pulls the web 50 from roll 10, pulls the unrolled dry web through the coating composition, and winds the coated web 51 around pipe 49. While being pulled and wrapped, coated fabric 51 is tensioned by tension bar 52 and by being pulled over and around the outer front edge 53 of bottom panel 36 of trough 32 as shown best in FIG. 4. Fabric roll 10 is moved along dispensing bar 41 at a rate which determines the winding angle at which coated web 51 is placed onto pipe 49. This in turn establishes the number of spiral windings per unit of pipe length and thereby the number of layers of coated web forming the pipe coating.

When the coated web material 51 has covered the desired length of the bare pipe 49, a cutting means 45 may be activated to cut the wound portion of the web from the continuous portion of the web supplied by dispensing means 44. The tail end of the cut fabric is then wrapped onto the pipe 49 as the last windings. The cutting means may comprise blades 46 and 47 which cooperate to cut the coated web 51.

Any excess liquid 48 on the pipe 49 may then be removed. This liquid preferably has a slurry-like consistency and is easily removed by hand or by a mechanical skimming means. The excess composition is preferably removed while the pipe 49 is over trough 32 so that the excess composition will drop back into trough 32 to be re-utilized. The coated pipe 49 is then uncoupled from the coupling 63 by holding (for example, by hand) the pipe to prevent its rotation and then reversing drill 78 to rotate drive shaft 53 in the opposite direction and disengage the internal threads of coupling 63 from pipe threads 61. Shaft 53 is then retracted and pipe 49 pulled axially toward the turning means to pull coupling 62 from fitting 95 and thereby remove the coated pipe from the coating device 31. Turning means 42 may be used to aid in pulling pipe 49 axially from fitting 95 if this is done before coupling 63 is disengaged from pipe threads 61. The removed pipe is then set aside for the coating to set and dry while other bare pipe segments are being coated. The dried coated pipe may then be utilized as described below.

The drive component of pipe turning means 42 may be any type of conventional shaft turning device from a simple manual turning mechanism to any type of motor driven mechanism. The drive component is preferably a motorized rotational means, such as the conventional drill 78. The web dispensing means 44 may be motorized and/or automated or simply the roll of fabric 10 rotatably and slidably mounted on bar 41 so as to be unwound and moved along an axial parallel to the rotational axis of pipe 49 as it is rotated. The web dispensing means 44 may include not only mechanical means to dispense the web from a roll, but mechanical means to move the web roll along the dispensing bar 41. In the embodiment shown by way of example only, the human worker 20 controls movement of the roll 10 with a portion of his body, such as his leg or knee.

The dispensing means 43 for dispensing a coating compostion may be any type of automated liquid or paste dispensing system or may be a very simple manual dispensing means, such as a person pouring mixed refractory mortar into the holding container portion of trough 32. The cutting means 45 may be any type of cutting means from an automated cutting mechanism to manually operated shears for cutting the web from a roll of web material.

Trough 32 may be of any shape or size desired. The bottom panel 36 and the back panel 33 may be placed at any desired angle to form an angled rear to hold the liquid mortar composition 48 in the contained volume where the web 50 passes around tension bar 52 and becomes impregnated with composition 48 to become a coated wrapping material or coated web 51. The pipe coating device 31 may have additional support legs, if the inverted T-shaped legs 55 and 56 supporting trough 32 prove to be unstable. The bottom panel 36 of the trough 32 has a drain valve 58 in order to drain and clean the bottom panel 36 and the interior of trough 32. The pipe coating device 31 may be placed on any supporting surface, such as floor 59.

Figures 5, 6, 7:
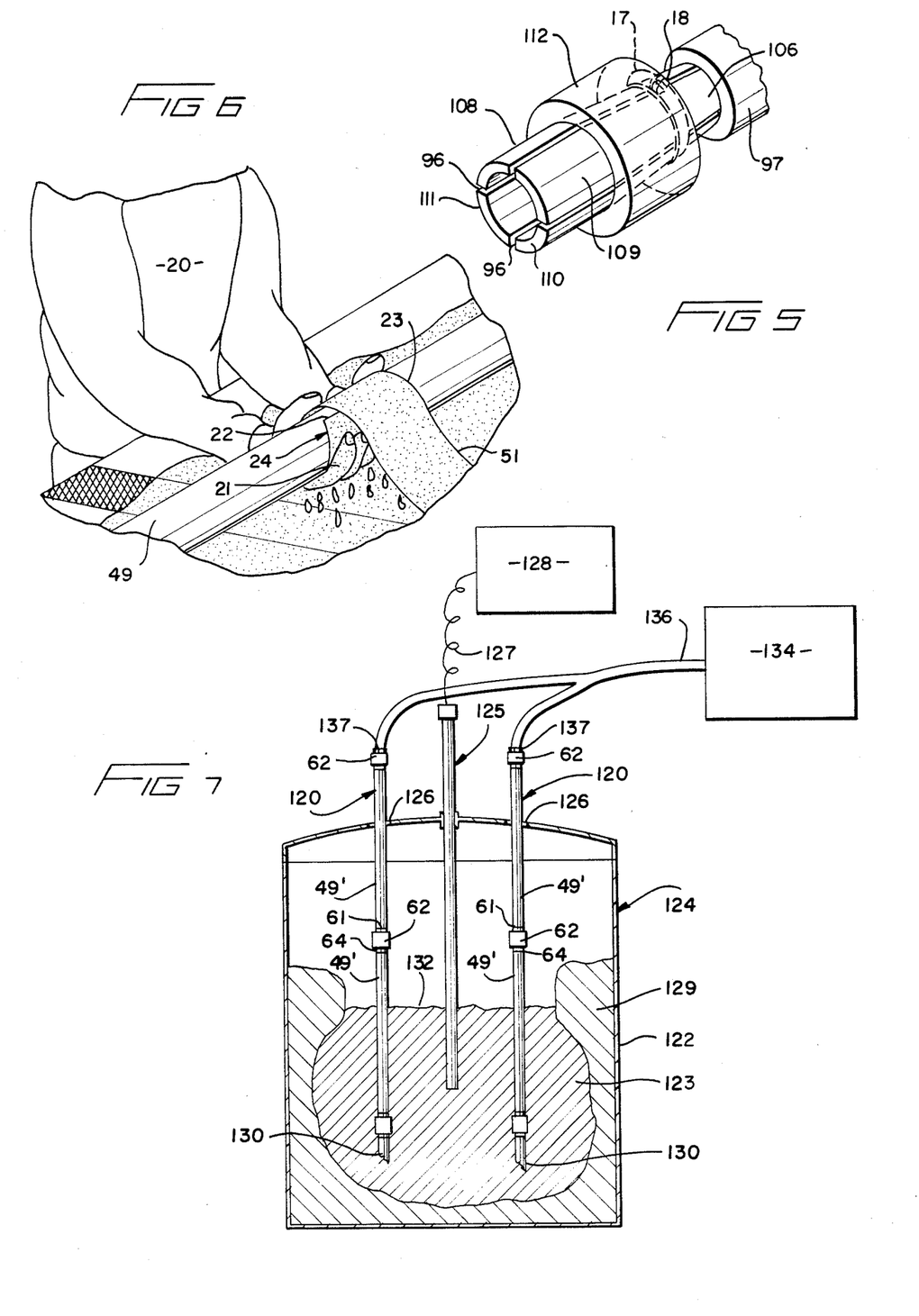
FIG. 5 is a perspective view showing details of a fitting for receiving a pipe coupling on one end of the pipe.
FIG. 6 is a fragmentary perspective view of a tucking procedure for locking onto a bare pipe surface the free leading end of an impregnated web.
FIG. 7 is a schematic representation of two strings of coated lances made in accordance with the invention as utilized within a furnace containing a molten metal bath.

The web tucking and locking procedure utilized with the method and device of the invention is illustrated in FIG. 6. A human worker 20 with hands 21 may physically tuck the leading end 22 of coated web 51 under the oncoming continuous web to form a tight tuck lock at the beginning of the wrapped coating. In this tuck lock, the leading end 22 of the web is brought over the top of bare pipe 49, wound completely around it, and placed back up under the portion 23 of coated web 51 which will form the next wrap. When the leading edge 22 of the coated web is tucked under the oncoming portion 23 of coated web 51, the turning means 42 is activated to rotate pipe 49 and pull the overlying wrap(s) tightly around the pipe, which jams a leading end portion 24 between the pipe surface and the overlying wrap(s) to securely lock the leading end portion 24 of the web to the bare pipe 49.

By tuck locking the coated web 51 to the pipe 49 and then rotating the pipe with frictional drag to tension the web, friction and pressure are generated which securely lock the leading end portion 24 of the web between the pipe and the overlying wrap(s) of web 51. The tuck lock is positioned to leave bare about 2 inches of pipe including threads 61 before the beginning of the wrapped portion of the pipe. the tuck locking method provides a secure attachment of the beginning wraps of coated web 51 to the bare metal of pipe 49 and thereby eliminates the need for extraneous fastening devices, which tend to be bulky and/or cumbersome and are difficult to keep in place.

When pipe 49 with the web secured thereto is turned by the pipe turning means 42, more of the coated web 51 is pulled onto and wrapped around the pipe 49. As the web roll 10 is moved along the web dispensing bar 41, the coated web 51 moves along the tension bar 52 and is wrapped around the pipe 49 in consecutive spirals which are overlapped or otherwise spaced relative to each other dependent on the speed of translational movement of roll 10 relative to the speed of rotation of pipe 49.

The coated web 51 is preferably cut by the cutting means 45 so that several inches of bare pipe before the end of pipe 49 are not covered with the coated web 51. The operator preferably manually wraps the tail portion of the cut coated web 51 around the pipe 49 so as to leave at least the coupling 62 exposed at the end, or at least about 2 inches of bare pipe if no coupling is used. If the mid-portion of pipe 49 is only partially covered with coated web 51 when the dry web 50 runs out, the empty roll core 11 can be replaced with a new roll 10 and the process begun again anywhere along the partially coated pipe 49 as desired.

FIG. 7 is a schematic representation of a pair of refining agent dispensing pipe or lance strings 120-120 being utilized within a melting vat 122. Melting vat 122 could be a vat which is utilized in melting and processing copper or any form of ferrous or non-ferrous metal composition. Melting vat 122 may be formed by the lower portion of a metal processing furnace 124. Melting vat 122 is shown as having a melting electrode 125 connected by wiring 127 to an electrical power source 128. Melting electrode 125 may be used to melt a scrap metal mass 129 within the melting vat 12 to form a molten bath 123. Any number of melting electrodes 125 and lance strings 120 may be utilized, only one electrode and two lance strings being shown for purposes of illustration.

The lance strings 120-120 may be placed through overhead door openings 126-126 in furnace 124, the free end 130 of each lance string 120 being placed beneath the surface 132 of molten bath 123 at any desired position within the volume of melting vat 122. Because of the large size of the furnace, each lance string 120 comprises a series of two or more coated pipe segments 49' connected together in succession by threaded engagement between the threads 61 on the succeeding segment and the coupling 62 on threads 64 of the preceding segment. Through lance strings 120-120 flow a refining agent, such as a reducing gas to refine the metal, from a supply 134 of the refining agent. The refining agent flows through a flexible conveying conduit or hose 136 and into each lance string 120 through a nipple 137 threaded to the coupling 62 of the last connected coated pipe segment 49'.

The supply 134 may supply a reducing gas of pure oxygen or of air or a pneumatic and solids mixture containing a reducing or other solid refining agent. The gas supplied may include a heating fuel such as propane for combustion in the furnace, or any other treating agent(s) as desired. The lance strings 120-120 may be moved in a manner so that the refining agent is dispersed throughout the desired volume of the vat 122. The refining agent(s) helps purify the desired metal to be recovered and the combustible fuel supplies heat by combustion to aid in melting scrap metal 129 into molten bath 123.

The coating formed by coated web 51 extends the life span of bare pipe core 49 considerably. However, after a period of time, even the coated pipe 49' will deteriorate within the melting vat 122. As the end 130 of the lance string deteriorates, more of the string will be extended into the melting vat 122 in order to place the end 130 into the desired volume. As the deterioration approaches a predetermined length of the lance string, the supply of refining agent is shut off and the nipple 137 is disconnected from the coupling 62 of the last coated pipe segment 49'. A new coated pipe segment 49' is then connected between nipple 137 and the disconnected coupling 62 to again provide the needed length of the lance string 120. Thereby, when lance string 120 continues to be fed into the melting vat 122, the complete length of the next coated pipe segment at the bottom of the lance string is utilized by being entirely consumed by heat disintegration into molten bath 123. The intermediate pipe coupling 62 adjacent to end 130 also disintegrates into molten bath 123. Thereafter, the lance replacement process is continuously repeated.

While the invention has been described with reference to specific embodiments, the description is illustrative and is not intended to be construed as limiting the scope of the invention. Various modifications and changes may occur to those skilled in the art without departing from the spirit and scope of the invention as defined by the following claims.

What is claimed is:

1. An apparatus for turning an elongated pipe comprising:
    frame means;
    first chuck means for rotatably mounting and driving one end of said pipe;
    drive means for causing rotation of said first chuck means;
    second chuck means positioned opposite to said first chuck means for slidably receiving the other end of said pipe to rotatably mount said pipe between said first and second chuck means, said second chuck means comprising a plurality of resilient fingers defining a recess for slidably receiving a smooth end portion of said other pipe end, said fingers having an inner base portion and an outer gripping portion, said outer gripping portion of said fingers defining an internal transverse dimension of said recess which is less than a corresponding external transverse dimension of said smooth pipe end portion such that said outer gripping portion of said fingers are forced apart and thereby tensioned to resiliently grip said smooth pipe end portion upon sliding insertion of said other pipe end into said recess, said first and second chuck means being rotatably mounted on said frame means for rotation about the longitudinal axis of said rotatably mounted pipe; and,
    reciprocation means for axially reciprocating said first chuck means towards and away from said one pipe end in the direction of the longitudinal axis of said rotatably mounted pipe, reciprocation of said first chuck means towards said one pipe end positioning said first chuck means for engaging said one pipe end to rotate said pipe by said drive means and causing said other pipe end to be retained in said recess of said second chuck means so as to mount said pipe for said rotation, and reciprocation of said first chuck means away from said one pipe end positioning said first chuck means for release of said one pipe end from said first chuck means and for slidable release of said other pipe end from said recess of said second chuck means.

2. The turning apparatus of claim 1 in which both of said pipe ends have external threads and said other threaded end of said pipe carries an internally threaded coupling for providing said smooth pipe end portion, and in which said first chuck means includes an engaging member having threads to threadedly engage said external pipe threads on said one pipe end.

3. The turning apparatus of claim 1 wherein said recess and said smooth pipe end portion are substantially cylindrical, said internal transverse dimension being the diameter of said recess and said external transverse dimension being the outer diameter of said smooth pipe end portion.

4. The turning apparatus of claim 1, which further comprises adjustable tensioning means for varying the internal transverse dimension of said recess in the absence of said other pipe end to thereby change the gripping force exerted by said fingers on said other pipe end.

5. The turning apparatus of claim 1 in which said drive means comprises a drive shaft having an end portion connected to said first chuck means, bearing means for rotatably mounting said drive shaft on a slide member, and means for mounting said slide member for sliding movement relative to said frame means so as to provide said reciprocation of said first chuck means.

6. The turning apparatus of claim 5 in which said drive means further includes a motor, a hand gripping handle member, and means for connecting said motor and said handle member to a portion of said drive shaft opposite to the end portion thereof connected to said first chuck means, said bearing means having means for preventing axial movement of said drive shaft relative to said bearing means so that movement of said handle member causes said slide member to move and thereby reciprocate said first chuck means.

7. The turning apparatus of claim 1 further comprising:
    a stationary trough for holding a liquid coating composition beneath said pipe mounted between said first chuck means and said second chuck means;
    web dispensing means for dispensing an elongated web of coating absorbent material toward said mounted pipe when said mounted pipe is turned by said drive means; and,
    movement means for moving said web dispensing means relative to said trough in a direction transverse to the direction in which said web is dispensed by said web dispensing means and substantially parallel to the rotational axis of said mounted pipe such that said web is spirally wound on said mounted pipe when said mounted pipe is turned by said drive means.

8. The turning apparatus of claim 7 further comprising an elongated bar for transversely engaging said web and means for mounting said bar within said trough, said bar being positioned above the bottom of said trough and having a web contacting surface below said liquid level such that said web is pulled through and coated with said liquid coating composition when said dispensed web passes around said bar before it is wound on said mounted pipe, and said web contacting surface extending substantially parallel to the rotational axis of said mounted pipe such that said coated web travels along said bar in a direction transverse to the direction in which said web is dispensed when said web dispensing means is moved relative to said trough by said movement means.

9. The turning apparatus according to claim 8 which further comprises means for tensioning said web such that said spiral windings of coated web are drawn tightly around said mounted pipe when said mounted pipe is turned by said drive means.

10. The turning apparatus of claim 9 in which said web tensioning means includes a drag member for tensioning said web before said web is pulled around said bar.

11. The turning apparatus of claim 10 in which said drag member is fixed relative to the movement of said web toward said mounted pipe and is positioned between said bar and the path of movement of said web dispensing means such that the turning of said mounted pipe by said drive means causes said web to be pulled past said drag member before being pulled around said bar.

12. The turning apparatus of claim 11 which further comprises means for mounting said bar for axial rotation, and in which said rotatably mounted bar is turned by engagement between said web contacting surface and said dispensed web, said bar mounting means engaging said bar so as to provide tension in said web during the winding thereof on said pipe.

13. The apparatus of claim 7 in which said movement means provides relative movement between said web dispensing means and said trough such that said web is spirally wound on said mounted pipe when it is turned by said drive means and said spiral windings are overlapped to provide a pipe covering comprising a plurality of layers of said coated web.

14. The turning apparatus of claim 1 further comprising:
    web dispensing means for dispensing an elongated web of wrapping material toward said mounted pipe when said mounted pipe is turned by said drive means with one end of said web secured to said mounted pipe;
    movement means for moving said web dispensing means in a direction transverse to the direction in which said web is dispensed by said web dispensing means and substantially parallel to the rotational axis of said mounted pipe such that said web is spirally wound on said mounted pipe when said mounted pipe is turned by said drive means; and,
    means for tensioning said web such that said spiral windings of dispensed web are drawn tightly around said pipe.

15. The turning apparatus of claim 14 in which said tensioning means comprises an elongated bar for transversely engaging said web and having a web contacting surface, said web contacting surface extending substantially parallel to the rotational axis of said mounted pipe such that said web travels along said bar in a direction transverse to the direction in which said web is dispensed when said web dispensing means is moved relative to said mounted pipe by said movement means.

16. The turning apparatus of claim 15 in which said movement means causes said web dispensing means to move said web along the web contacting surface of said bar for a distance at least substantially equal to the length of the portion of said mounted pipe to be wrapped with said web.

17. An apparatus for turning an elongated pipe comprising:
    frame means;
    first chuck means for rotatably mounting and driving one end of said pipe, said one end of said pipe having external threads and said first chuck means including an engaging member having threads to threadably engage said external threads;
    drive means for causing rotation of said first chuck means;
    second chuck means positioned opposite to said first chuck means for slidably receiving the other end of said pipe to rotatably mount said pipe between said first and second chuck means, said other end of said pipe having external threads carrying an internally threaded coupling having a smooth outer surface, and said second chuck means comprising a fitting defining an axial recess for slidably receiving said coupling and means for frictionally engaging said outer surface of said coupling, said first and second chuck means being rotatably mounted on said frame means for rotation about the longitudinal axis of said rotatably mounted pipe; and,
    reciprocation means for axially reciprocating said first chuck means towards and away from said one pipe end in the direction of the longitudinal axis of said rotatably mounted pipe, reciprocation of said first chuck means towards said one pipe end positioning said first chuck means for engaging said one pipe end to rotate said pipe by said drive means and causing said other pipe end to be retained in said second chuck means so as to mount said pipe for said rotation, and reciprocation of said first chuck means away from said one pipe end positioning said first chuck means for release of said one pipe end from said first chuck means and for slidable release of said other pipe end from said second chuck means.

18. The turning apparatus of claim 1 wherein said second chuck means includes means for varying the tensioning of said fingers to change the resilient grip thereof when said other pipe end is inserted into said recess.

19. The turning apparatus of claim 18 wherein said means for varying the tensioning of said fingers comprises a collar slidable relative to the length of said fingers and means for retaining said collar in a fixed position relative to the length of said fingers.

20. An apparatus for turning an elongated pipe comprising:
    frame means;
    first chuck means for rotatably mounting and driving one end of said pipe;
    drive means for causing rotation of said first chuck means;
    second chuck means positioned opposite to said first chuck means for slidably receiving the other end of said pipe to rotatably mount said pipe between said first and second chuck means, said second chuck means comprising a fitting defining a recess for slidably receiving a smooth end portion of said other pipe end and including a resilient finger having an inner base portion and an outer gripping portion, said outer gripping portion of said finger and another part of said fitting being adapted to engage said smooth pipe end portion and together defining an internal transverse dimension of said recess which is less than a corresponding external transverse dimension of said smooth pipe end portion such that said outer gripping portion of said finger is forced radially away from said another part of said fitting and thereby tensioned to cause said fitting to frictionally grip said smooth pipe end portion upon sliding insertion of said other pipe end into said recess, said first and second chuck means being rotatably mounted on said frame means for rotation about the longitudinal axis of said rotatably mounted pipe; and,
    reciprocation means for axially reciprocating said first chuck means towards and away from said one pipe end in the direction of the longitudinal axis of said rotatably mounted pipe, reciprocation of said first chuck means towards said one pipe end positioning said first chuck means for engaging said one pipe end to rotate said pipe by said drive means and causing said other pipe end to be retained in said recess of said second chuck means so as to mount said pipe for said rotation, and reciprocation of said first chuck means away from said one pipe end positioning said first chuck means for release of said one pipe end from said first chuck means and for slidable release of said other pipe end from said recess of said second chuck means.

* * * * *